Feb. 12, 1924.

A. F. POOLE 1,483,679

COMBINED TYPEWRITING AND CALCULATING MACHINE

Filed April 19, 1921  6 Sheets-Sheet 1

WITNESSES
E. M. Wells.
R. H. Strother.

INVENTOR
Arthur F. Poole
By Jacob Felbel
HIS ATTORNEY

Feb. 12, 1924.
A. F. POOLE
1,483,679
COMBINED TYPEWRITING AND CALCULATING MACHINE
Filed April 19, 1921
6 Sheets-Sheet 3

Fig. 4

WITNESSES
E. M. Wells
R. H. Strother

INVENTOR
Arthur F. Poole
By Jacob Felbel
HIS ATTORNEY

Feb. 12, 1924. 1,483,679
A. F. POOLE
COMBINED TYPEWRITING AND CALCULATING MACHINE
Filed April 19, 1921 6 Sheets-Sheet 4

WITNESSES
E. M. Wells.
R. H. Strother.

INVENTOR
Arthur F. Poole
By Jacob Felbel
HIS ATTORNEY

Feb. 12, 1924.

A. F. POOLE

COMBINED TYPEWRITING AND CALCULATING MACHINE

Filed April 19, 1921    6 Sheets-Sheet 6

WITNESSES
E. M. Wells.
R. H. Strother.

INVENTOR
Arthur F. Poole
By Jacob Felbel
HIS ATTORNEY

Patented Feb. 12, 1924.

1,483,679

UNITED STATES PATENT OFFICE.

ARTHUR F. POOLE, OF KENILWORTH, ILLINOIS, ASSIGNOR TO REMINGTON ACCOUNTING MACHINE CORPORATION, OF NEW YORK, N. Y., A CORPORATION OF NEW YORK.

COMBINED TYPEWRITING AND CALCULATING MACHINE.

Application filed April 19, 1921. Serial No. 462,628.

*To all whom it may concern:*

Be it known that I, ARTHUR F. POOLE, citizen of the United States, and resident of Kenilworth, in the county of Cook and State of Illinois, have invented certain new and useful Improvements in Combined Typewriting and Calculating Machines, of which the following is a specification.

My invention relates to calculating machines, and especially to combined typewriting and calculating machines.

My invention has for its principal object to provide improved clearance proof mechanism for calculating machines. My invention includes among other things means for printing and registering numbers according to a prearranged program, and clearance proof mechanism that is brought into action automatically at a predetermined point in said program.

My invention will be understood from the accompanying drawings in which—

Figs. 9–14 inclusive illustrate a modification.

I have shown my invention applied to the combined typewriting and calculating machine which is sometimes referred to as the Remington-Wahl cross footing machine. Said cross footing machine is constructed substantially according to the patent to John C. Wahl, No. 1,270,471, dated June 25, 1918, to which patent reference is made for a complete disclosure of said machine. In the present instance I have shown in the drawings only so much of the machine as is necessary to an understanding of the application of my invention thereto. It will, of course, be understood that the invention may be applied or adapted to other machines.

Figures 1, 15:
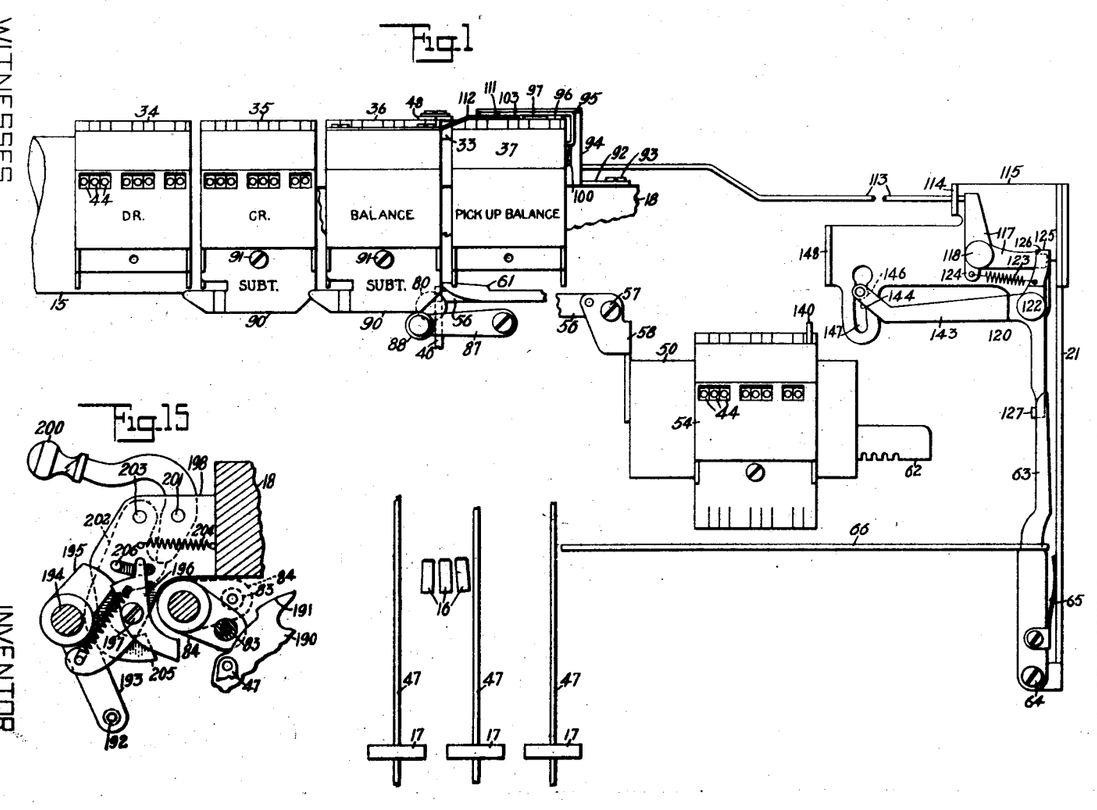
Fig. 1 is a diagrammatic view in front elevation of calculating mechanism including my invention.
Fig. 15 is a detail view in vertical section through a portion of the Wahl actuator and showing the disconnect device of the Wahl mechanism.
Figure 10:
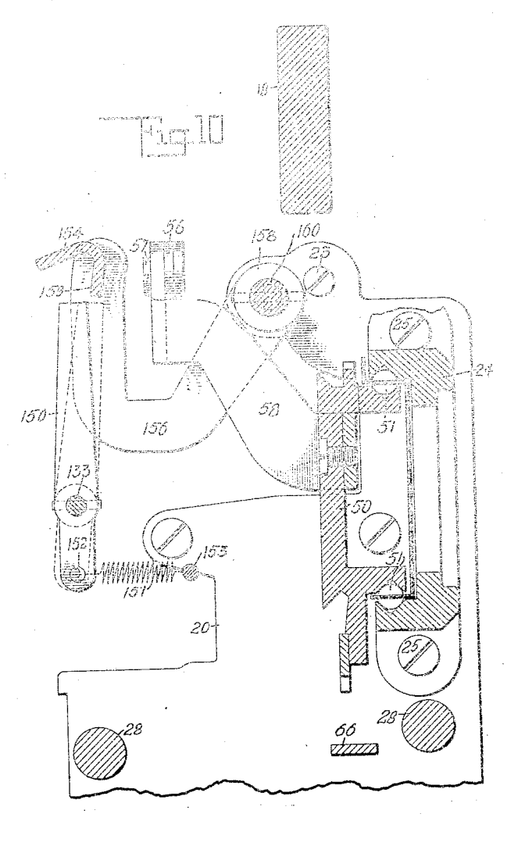
Fig. 10 is a section on a vertical front-to-rear plane through the cross footer carriage and looking toward the left.

The Remington typewriting machine includes a carriage of which only the platen 15 is conventionally shown in Fig. 1. It also includes printing mechanism of which some type bars 16 and keys 17 are conventionally shown in the same figure. The stationary framework of the Wahl mechanism includes a casting 18 suitably secured to the framework of the typewriter. The framework of the cross footing mechanism includes two plates 20 and 21 suitably secured to the casting 18, the latter by means of two screws 22 (Fig. 5), and the former by several means including a screw 23 (Fig. 10). Said cross footing framework also includes a casting 24 secured by screws 25 to the plates 20 and 21. Said cross footing framework also includes certain frame plates 26 and 27 and certain transverse rods 28 secured by screws 30 to the plate 21.

The Wahl mechanism includes a decimal carriage or truck 31 (Fig. 4) supported at the middle of the machine by three rolls or wheels 32, suitably journaled in the stationary framework; and at its ends said truck is connected with and partially supported by the typewriting carriage so as to travel toward the right and toward the left with said carriage. The upper roll 32 has a vertical arbor journaled in an overhanging bracket 33 projecting from the casting 18. Any suitable number of vertical totalizers can be mounted side by side on the truck 31. In the present instance I have shown two totalizers 34 and 35 and two "dummies" 36 and 37. Each of these "dummies" consists merely of the framework of the totalizer with the computing mechanism omitted, and they are put onto the machine in order to co-operate with the cross totalizer. These "dummies" may if preferred be replaced with complete totalizers. Each totalizer or "dummy" is secured on the truck by the well known "dove-tail" connection and also by means of a spring pressed latch 38 engaging a toothed rack 40. In order to avoid confusion in the drawings these latches 38 are omitted from the diagrammatic view (Fig. 1). Each of them includes an over-hanging finger piece 41 and a spring loop 42 which may be pivoted to the top of the totalizer at 43 and when the totalizer is in position on the carriage this loop can be swung around underneath the finger piece 41 and exert a stiff upward spring pressure to hold the latch 38 more firmly in place.

Each of the totalizers is of the ordinary Wahl construction and includes dial wheels 44 and carrying wheels 45, (Fig. 4) the latter adapted to be driven by the main master wheel 46. Said master wheel constitutes part of a main actuator which actuator is operated by well known means from the numeral keys 17 with which it is connected by means of links 47. Each vertical totalizer has on its upper casing a decimal scale with which a pointer 48 co-operates, said pointer being mounted on the bracket 33.

Figure 4:
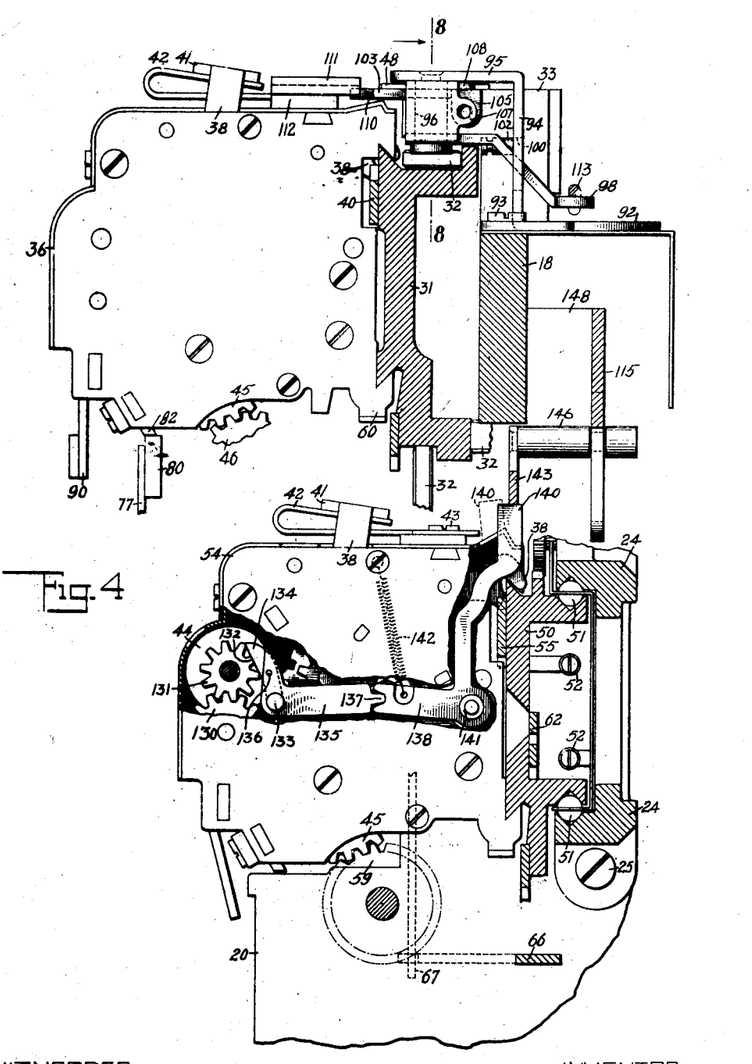
Fig. 4 is a right-hand side elevation partly in section and partly broken away.
Figure 5:
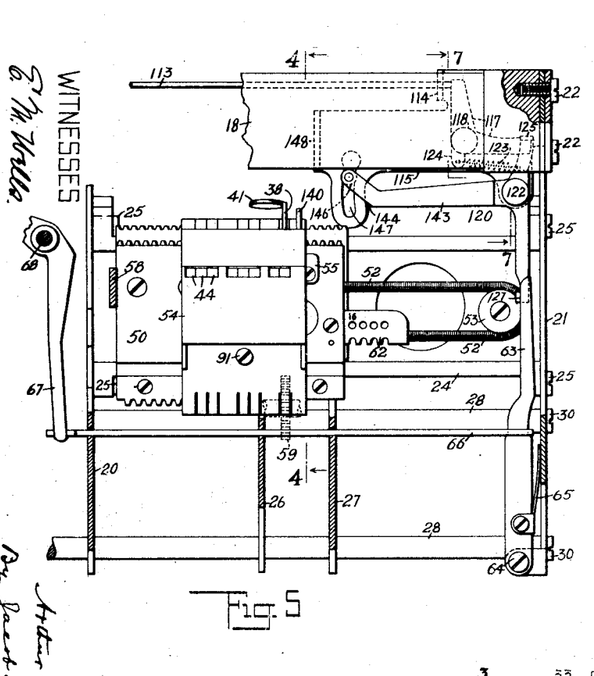
Fig. 5 is a front elevation of the cross footing totalizer and associated mechanism.

The cross footing carriage consists of a small truck 50, (Fig. 4) traveling by means of ball bearings 51 in the casting 24 and drawn toward the right by a long tension spring 52 running over a pulley 53 (Fig. 5). Said truck has a totalizer 54 mounted thereon, its latch 38 co-operating with a plate 55 secured to the truck 50 and having therein a single notch. The totalizer 54 is operated by a cross footing actuator comprising a master wheel 59.

The truck 50 normally stands in its extreme right-hand position but on occasion it is picked up by the vertical totalizers and "dummies" by means of a hook 56 pivoted at 57 to a bracket 58 secured to said truck. Said hook engages a lug 60 (Fig. 4) on the side plate of the vertical totalizer which lug is also engaged on its opposite side by a detent 61 (Fig. 1). The truck is drawn to the left in the writing and calculating of a number until the last carrying wheel 45 is in engagement with the master wheel 59. At the next step of the carriage the hook 56 is disconnected and the cross footing truck is drawn to the right by its spring 52 until it is arrested in normal position by means of an adjustable stop bar 62 secured to the truck, said bar striking a lever 63 and moving said lever over against the frame plate 21. This is sometimes called a "jumping totalizer". In some machines, as in the present one, it is the totalizer itself that "jumps" and in other machines it is the master wheel, etc., that "jumps". Said lever 63 is pivoted at 64 to an ear of the plate 21 and it is provided with a spring 65 tending to swing said lever to the left to the position shown in Fig. 5. I shall find it convenient to refer to this lever 63 as a locking member.

Figures 2, 3:
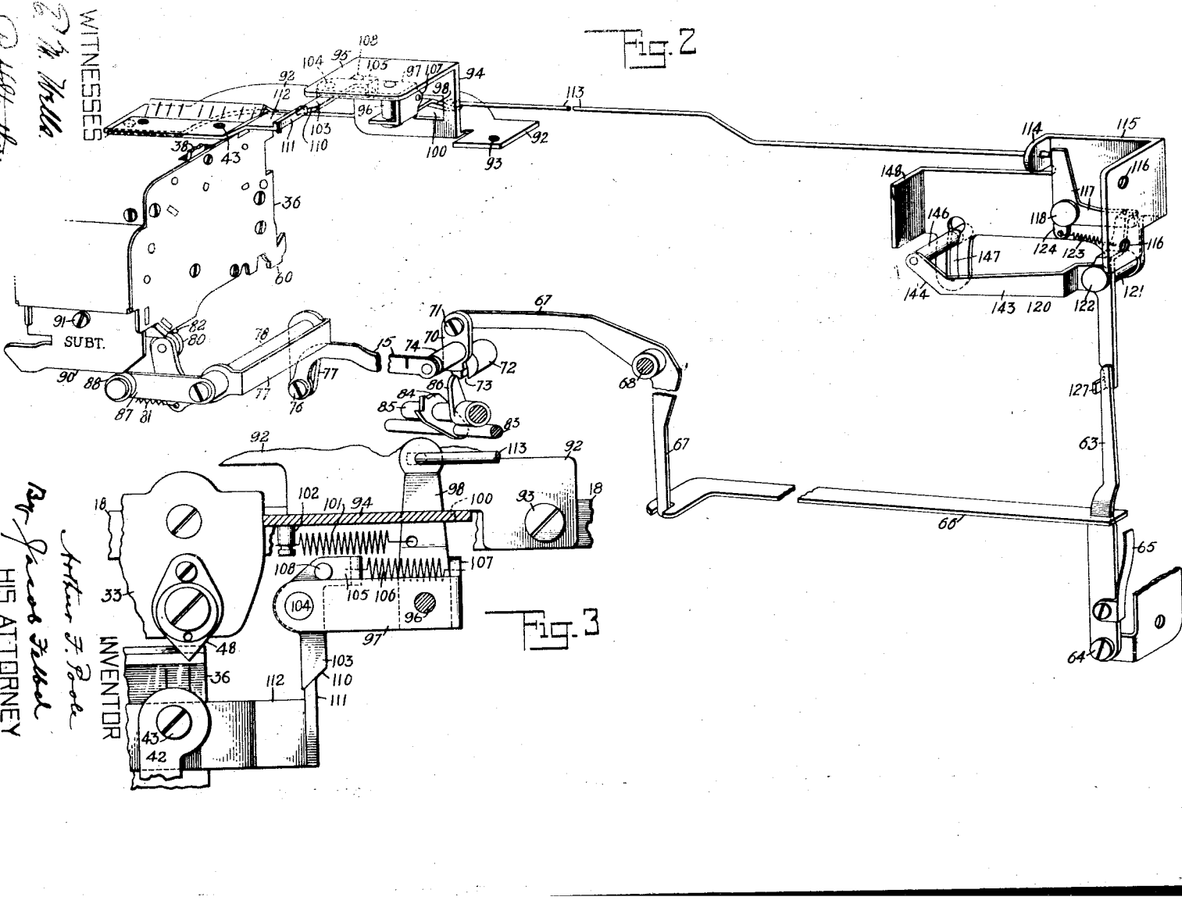
Fig. 2 is a skeletonized perspective view of portions of said mechanism.
Fig. 3 is a fragmentary top plan view of certain details, partly in section on the line 3—3 of Fig. 8.

Said lever passes through a suitable slot in a slide link 66 so that said link is moved a short distance to the left or to the right by the motion of the lever 63. Said link is guided in the frame plates of the cross footer and at its left-hand end it has a crotch that embraces the depending arm of a bell crank 67 pivoted at 68 in the stationary framework. The horizontal arm of the bell crank 67 has a blocking device 70 pivoted thereto at 71 and lying against the forward end of a fixed post 72 having a longitudinal slot 73 in its under-side. The construction is such that when the lever 63 is in its left-hand position, as shown in Figs. 5 and 2, the blocking plate 70 stands at an elevation above the slot 73; but when the said lever is moved to its right-hand position this blocking plate moves down low enough to cover up the end of said slot. The swinging motion of the blocking plate 70 about its pivot 71 is controlled through a post 74 by a link 75 pivoted at 76 to a depending arm of a swinging frame 77 pivoted on a rock shaft 78 which is journaled in the stationary framework. The frame 77 has a roller 80 on a horizontal arm thereof, which roller is normally held in an upper position by means of a spring 81 but which, when a vertical totalizer is over the master wheel 46, is adapted to be depressed by a track or rail 82 mounted in said vertical totalizer. The whole construction is such that when there is no vertical totalizer over the master wheel 46 then the plate 70 is swung so far to the left as not to be able to cover the slot 73 in the post 72; but when a vertical totalizer is over the master wheel then said plate is swung to the right far enough to cover said slot. This is a well known lock in use in the Remington-Wahl machine and described in the patent hereinbefore referred to. It will be perceived that it is so constructed that the plate 70 can never block up the opening to the slot 73 except when a vertical totalizer is over the master wheel and it is also so constructed that said plate cannot block up said opening except when the lever 63 is in its right-hand position, so that it requires a combination of two conditions to cause said plate to block up said slot.

Comprised within the main actuator is a universal bar 83 (Fig. 2) consisting of a roller turned in certain arms 84 rigidly mounted on a universal rock shaft 85. The links 47 actuate certain devices 190 (Fig. 15) sometimes called fans, each of which is adapted to engage the universal bar 83 and swing it toward the front of the machine thus rocking the shaft 85. Said shaft has an arm 86 rigidly projecting therefrom in such position that when the shaft is rocked as described this arm moves into the slot 73. This it is always free to do except when, under the above mentioned combination of conditions, said slot 73 is blocked by the plate 70. In that event the shaft 85 and the universal bar 83 are locked against movement and the keys are therefore locked against depression and the operation of the machine cannot be proceeded with until the plate 70 shall have been moved away from the slot 73. I have described this lock in some detail because it is already present in the machine and I find it convenient to use it in connection with my clearance proof mechanism, but it will of course be understood that any other suitable means for locking some essential part of the mechanism would answer my purpose.

In the Wahl machine as manufactured and as described in the patent hereinbefore referred to, the rock shaft 78 has an arm 87 projecting leftward therefrom and carrying a roller 88 adapted to co-operate with cams 90 mounted on the framework of certain of the vertical totalizers and "dummies". Said arm is urged upward to a limited extent by a spring not shown herein and when it is in its uppermost position the master wheel 59 of the cross footer is connected up for addition. When said arm occupies its lowest position said master wheel is connected up for subtraction and when it occupies an intermediate position the master wheel 59 is not connected to the balance of the actuating mechanism so that the cross footer is inoperative. This arm therefore has a normal elevated position in which the cross footer is set for addition; a middle position in which said cross footer is disconnected, and a lowest position in which the cross footer is set for subtraction. The details of this automatic control of the state of the cross footing actuator are fully disclosed in the patent above referred to.

The machine can be set in various ways to perform over and over again a regular program of writing and calculation, and one instance of such a setting is diagrammatically illustrated in Fig. 1. The program here is that of making daily entries on ledger sheets which customarily consist of leaves in a loose-leaf book. According to this program the items written in one day are contained in four column positions; debtor, creditor, balance and old balance or pick-up-balance, said columns occurring on the paper in the order named. In using the machine, when a ledger sheet is put in to the machine around the platen 15 the first operation is to write the old or pick-up-balance in the fourth column. Usually this is written on the same line as the old balance which had been written in the third column at the next preceding operation on that particular ledger sheet. The operator, therefore, when the paper is put into the machine turns the platen 15 to bring the last written line to the writing line and in column "4" copies the balance seen just to the left of it in column "3". The paper is then line-spaced and the carriage drawn back to begin a new line of writing. The debtor item then written in column "1", and the creditor item in column "2", and the resulting balance is then written in column "3", and this is the end of the program. If there is more than one debtor or creditor item to be entered the paper is line spaced and the second item written under the first, but in every case the writing of the new balance in column "3" is the last operation on that particular sheet at that particular time. This sheet is then removed from the machine and another sheet inserted and a similar program gone through with. In Fig. 1 the parts are shown in position for writing the digit of lowest order in the third column, and the next key-stroke, to write said digit, will end the program. This last key-stroke will cause the carriage to step one space to the left, and the cross-totalizer to be freed and allowed to snap back to its extreme right-hand position, or at least as far as "dummy" 37 will allow it to go. When the next ledger sheet is put into the machine the carriage is already in position to go ahead and copy in the pick-up-balance for that sheet.

In the program described the calculation of the new balance is effected on the cross totalizer 54, and this is accomplished by causing the pick-up-balance written in column "4" to be added into said cross totalizer, and the debtor item written in column "1" to be also added in said cross totalizer, and the creditor item written in column "2" to be subtracted in said cross totalizer. At this time said cross totalizer will show the new balance and if said cross totalizer is set for subtraction when copying the new balance in column "3", the copying of said new balance, if correctly done, will bring said cross totalizer to zero. In this program, therefore, the cross totalizer should always stand at zero when it is freed for its jump to the right by the next key-stroke made when the parts are in the position shown in Fig. 1. In order to cause the numbers to be automatically added and subtracted as described subtraction cams 90 are placed on the totalizer 35 and "dummy" 36 and are omitted from totalizer 34 and "dummy" 37. It will be observed that as far as carrying out this program is concerned totalizers 34 and 35 could also be "dummies" if preferred but it is sometimes useful to preserve the grand total of all debtor items and of all creditor items and the first two columns have, therefore, been defined by totalizers rather than by "dummies". In some instances totalizers are used instead of the "dummies" 36 and 37, as the totals indicated on this at the end of the day can sometimes be used for checking up the work. I have provided clearance proof mechanism with means for bringing it into operation automatically by the last key stroke in the program, this being the point in the program at which the cross totalizer should always be clear. In the present instance said clearance proof mechanism is brought into operation by the next step in the carriage following the position shown in Fig. 1. At this same step of the carriage the hook 56 will be released from the "dummy" 36 and the cross totalizer will be thrown back to the right by its spring 52.

A sheet metal plate 92 is secured on top of the casting 18 by screws at 93, one of said screws being at the right and the other at the left of the bracket 33. Just at the right of said bracket 33 the plate 92 has bent upward therefrom a bracket comprising an upstanding part 94 and a forwardly extending horizontal part 95. A headed stud 96 riveted to the part 95 from the underside thereof serves as a pivot for a bell crank having an upper leftward extending arm 97 and a lower rearward extending arm 98, the sheet metal of which the bell crank is constructed being bent as shown so as to pivot on the stud 96 at two points spaced apart. In order to accommodate the rearward arm 98 an opening or window 100 is cut in the bracket 94, one wall of said opening serving to limit the motion of the arm 98 toward the left. Said arm is drawn toward the left by means of a spring 101 connected to a fixed stud 102. A dog 103 is pivoted at 104 to the free end of the arm 97 and said dog has an arm 105 which is connected by means of a spring 106 with an ear 107 of the bell crank 97, 98, said spring tending to turn the forward projecting end of the dog toward the left. The motion of said dog in that direction relative to the arm 97 is limited by a pin 108 projecting from the dog in position to strike the arm 97. The forward end of said dog 103 is formed with a bevel 110 which, when the parts stand in the position above described, namely, in position to write the last digit of the new balance, is engaged or about to be engaged by a trip 111 consisting of a cam made on the right-hand end of a bar 112 secured to the top of the casing of the totalizer or "dummy" 36 by two screws of which one may be the pivot screw 43 hereinbefore referred to. The construction is such that when the carriage takes its next step beyond the position shown in Figs. 1 and 3, the bell crank 97, 98 will be rocked in a clockwise direction (Fig. 3) moving the arm 98 toward the right. During this same step of the carriage the cam 111 escapes from the dog 103 and allows said bell crank to be restored to its normal position by its spring 101, so that the motion of the arm 98 consists of a quick motion to the right and back again. After the cam 111 has escaped from the dog 103 and the carriage is drawn back toward the right to begin a new line, said cam, when it strikes said dog, does not rock the bell crank 97, 98 but only rocks the dog 103 about its pivot 104 and it is for this reason that the cam surface 110 is made on said pivoted dog instead of being a rigid part of the bell crank.

Figures 6, 7:
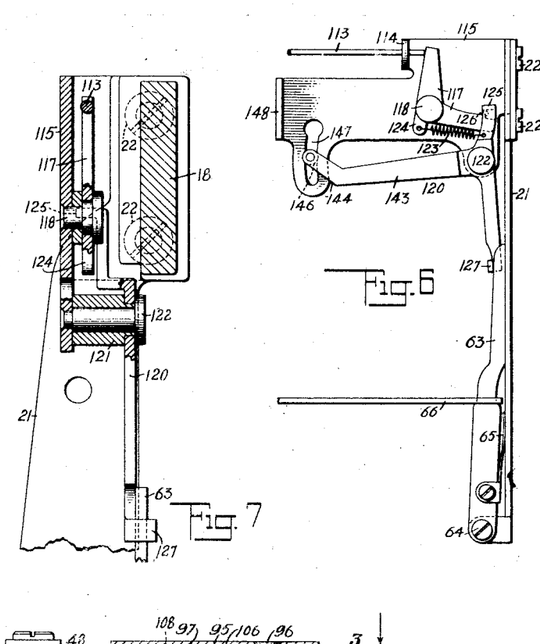
Fig. 6 is a similar view of parts of the clearance proof mechanism which is here shown in locking position.
Fig. 7 is a section on line 7—7 of Fig. 5 but on a larger scale.
Figure 8:
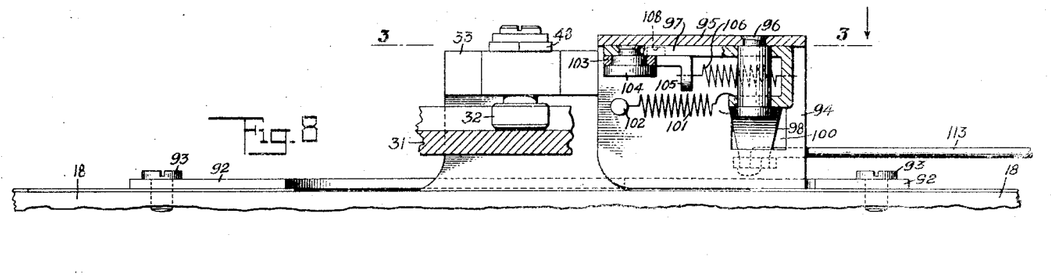
Fig. 8 is a sectional elevation on line 8—8 of Fig. 4.

Connected to the free end of the arm 98 of said bell crank is a push wire 113 which extends nearly to the right-hand side of the machine where its free end is guided in an opening in an ear 114 in a sheet metal bracket 115 bent up as shown in Fig. 2 and having in it two holes 116 (Fig. 2). The part of said bracket that contains said holes lies flat against the frame plate 21 and the screws 22 pass through said holes and thus secure the bracket in place. When the wire 113 is pushed toward the right it operates the upstanding arm of a latch 117 pivoted to the bracket 115 on a headed stud 118. The latch 117 controls a three-arm lever 120, the shape of which is best shown in Figs. 6 and 7. Said lever is rigidly mounted on a hub 121 pivoted on a headed stud 122 projecting forward from the bracket 115. A spring 123 is connected at one end with the upward extending arm of the lever 120 and at its other end to a depending arm 124 of the latch 117 so that the tension of said spring tends to turn said latch and said three-arm lever, both in a counter-clockwise direction as viewed in Fig. 6. In other words, it tends to move the upstanding arm of the lever 120 toward the left and the horizontal arm of the latch 117 upward. Said upstanding arm has a rearwardly extending lug 125 and said latch arm has a shoulder 126 and when the parts are in the normal position, as shown in Figs. 1, 2 and 5, the upstanding arm of the lever 120 occupies its right-hand position and the horizontal arm of the latch lever occupies its upper position, and each of these parts prevents motion of the other under the stress of the spring 123; but if the wire 113 be pushed toward the right as shown in Fig. 6, the latch arm will be depressed, its shoulder will be moved out of engagement with the lug 125, and the arm of the lever 120 will move toward the left as shown in said Fig. 6. The effect, therefore, of the next step of the carriage beyond the position shown in Fig. 1 will be to release the lever 120 and allow it to be moved by its spring 123 in a counter-clockwise direction from the position shown in Fig. 1 to the position shown in Fig. 6. Said lever 120 has a depending arm that lies just behind the upper end of the lock lever 63 which in this machine has been prolonged upward for the purpose; and the lever 120 has bent off therefrom a lug 127 which engages the lever 63 and moves it to locking position as shown in Fig. 6; but when the parts are in the normal position as shown in Fig. 1 the lug 127 allows the lever 63 to assume its normal position also. It will be observed, therefore, that when the lever 120 is tripped off by the stepping of the "dummy" 36 to its sub-units position the effect will be to throw in the locking mechanism which has been above described and which will prevent further operation of the machine for calculating purposes. In other words, it will prevent a continuation or repetition of the program of operation of the machine.

Means are provided to immediately release the lock in case the cross totalizer 54 stands at zero. Referring to Fig. 4, each carrying wheel 45 of the cross totalizer meshes with an idler pinion 130 which meshes with a pinion 131 on the side of the corresponding dial 44. Each of the pinions 131 has one short tooth 132 which, when the dial 44 stands at zero, occupies the position shown in Fig. 4. An arbor or rocking device 133 extends through the totalizer and at its ends has trunnions which are pivoted in the side plates of the totalizer. This rocking device is in the form of a comb comprising a series of feeler fingers 134. I have not illustrated this feeler comb in detail because it is a well known construction, an instance of it being shown for example in my Patent No. 1,311,710 dated July 29, 1919. The construction is such that if all of the wheels of the totalizer stand at zero then the fingers 134 can occupy the forward position shown in Fig. 4 but if any one of said wheels does not stand at zero then said wheel will have a full length tooth thereon in engagement with a finger 134 and said rocking device will be forced to occupy a position in the rear of that shown in the drawing. A lever 135 is mounted on the rocking device 133 to which it is rigidly connected by a dowel pin 136, said lever being at the extreme right-hand side of the totalizer just inside the frame plate. At its rear end the lever 135 has a tooth 137 which enters a crotch in the forward end of an arm 138 of a bell crank which has an arm 140 extending upward and projecting above the casing of the totalizer, passing through a suitable slot in said casing. The bell crank 138—140 is pivoted on a frame rod 141 constituting a well known part of the Wahl totalizer. A tension spring 142 connected at one end to the arm 138 and at the other end to a part of the totalizer frame, tends to rock the arm 138 upward and the arm 140 toward the rear. Due to the connection between levers 138 and 135 this spring also tends to press the feelers 134 toward the pinions 131 so that whenever all of said pinions stand at zero the arm 140 occupies its rear position shown in full lines in Fig. 4 and when any one or more of said wheels does not stand at zero said lever arm 140 stands in its forward position shown by dotted lines in Fig. 4.

The lever 120 has its third arm 143 extending toward the left from its pivot and terminating in an incline or cam edge 144 and this arm of course has an upper position when the lever 120 is latched by the latch 117 and a lower position when said latch is tripped as shown in Fig. 6. As will be understood by a comparison of Figs. 4 and 6, the relative positions of the parts are such that when the arm 140 stands in its rear position, indicating that the totalizer is clear, the arm 143 stands in the path of said arm 140 when the totalizer snaps back to the right at the end of a writing column, and the relation of said parts is also such that when the lever arm 143 is in its lower position and the arm 140 is in its rear position, then when the totalizer snaps back to the right said arm 140 will engage the cam edge 144 and lift the arm 143 and thus restore the lever 120 to its normal position where it will be caught and retained by the latch 117, thus releasing the lock or neutralizing or reversing the operation of it. If, on the other hand, the totalizer is not at zero and the arm 140 therefore occupies its forward position shown on dotted lines in Fig. 4, then when the totalizer snaps back to the right this arm will not strike the arm 143 and the lock will not be released. It will be perceived that at a definite point in the program the lock is always thrown into action where it will remain if the totalizer is not clear; but if the totalizer is clear then the lock will immediately be automatically released. The construction is such that if the operator fails to copy the total correctly the machine will be locked up against a continuation or repetition of the program, but if the total is copied correctly then there will be no interruption at all in the operation of the machine, which may go on exactly as if the clearance proof mechanism were not present. This mechanism causes no interruption to the work and does not require the operator to do anything nor to give it any attention at all as long as the work is correctly done. In case of an error it automatically locks the machine. In this event the operator may raise the lever arm 143 by hand, thus unlocking the machine, and may then proceed to correct the error in the usual way.

In order to guide the lever arm 143 and to prevent it from getting accidentally bent so that it would not cooperate correctly with the arm 140, a post or stud 146 is riveted to the free end of said arm and extends toward the back of the machine, passing through a keyhole slot 147 in the bracket 115. The enlarged end of said slot is large enough to insert the pin 146 through it in assembling the machine but the long part of the slot is of a width less than the diameter of the pin, which pin has an annular groove in it that enables it to move up and down in said slot. The shoulders of this groove prevent any bending of the arm 143 toward the front or toward the back of the machine. In order to position accurately the part of the bracket 115 where said guide slot is located said bracket has a part 148 bent toward the front of the machine and resting against the rear face of the casting 18.

The mechanism in the totalizer is small and it is not desirable to subject said mechanism to any considerable force, nor to require the moving parts of the mechanism to actuate or control other mechanism where the resistance is likely to be anything else than slight. The raising of the lever arm 143 to release the lock is not a heavy operation, but nevertheless it is decidedly preferable to have it performed by some other part than the gearing of the totalizer itself. By the above described construction it will be seen that the mechanism of the totalizer has to stand nothing but the pressure of the spring 142, which pressure is very light. Said mechanism controls the position of the lever arm 140, which is in the nature of a tappet, trip device or operating device and which can be made of fairly substantial material and dimensions. Thus the small and light mechanism of the totalizer is used merely to control the position of an operating part or tappet which itself does the actual work of releasing the lock.

Throughout the description the totalizer has been referred to as the traveling element but in some machines the totalizer is stationary and the other mechanism travels past it. It will of course be understood that as far as my invention is concerned it is immaterial which is the traveling element of the machine, the operations being effected by the relative motions of the parts.

Figure 9:
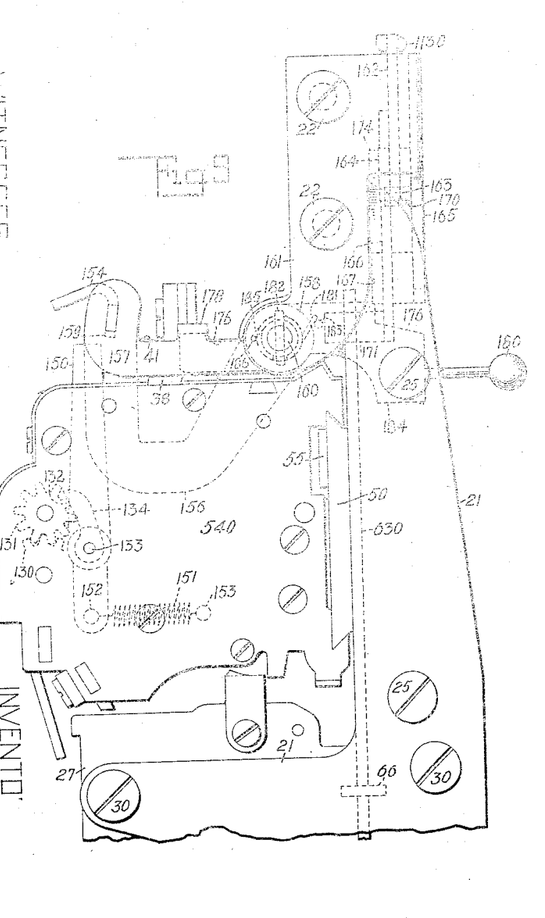
Fig. 9 is a right-hand side elevation of the cross-footing totalizer and associated parts of the machine.

My invention can, of course, be modified considerably and one of such modifications is illustrated in Figs. 9 to 14 inclusive. In this form of the invention the parts associated with the vertical totalizer, that is to say, the bar 112 and the bell crank 97, 98 operated by said bar, are or may be identical with the corresponding parts in the first form of the invention, and a wire 1130 extends toward the right from the lever arm 98 in much the same way as the wire 113. The cross totalizer 54 is replaced by a cross totalizer 540 in which the pinions 131 have each a short tooth 132 exactly as in the first instance and there is a feeler comb 134 pivoted in the same manner as before; but the levers 135 and 148, 140 are not employed. Instead, the rocker 133 is prolonged through the left-hand casing plate of the totalizer where it has rigidly mounted on it a lever 150 which stands approximately vertical just outside the casing. A contractile spring 151 is attached at one end to a post 152 on the lower arm of said lever and at its other end to a post 153 projecting from the casing and the tension of this spring tends to rock the feelers and the lever 150 in counter-clockwise direction in Fig. 9, that is to say, in the direction to press said feelers against the teeth of the pinions 131. The construction is such that if all the wheels stand at zero the upper end of the lever 150 will occupy its forward position as shown in Fig. 9, and shown by full lines in Fig. 10, but if any one or more of the register wheels do not stand at zero then the upper end of the lever will be moved rearward to the position shown by dotted lines in Fig. 10.

A hand operated bar 154 extends nearly across the cross footer frame and is mounted at its ends in a left-hand lever arm 156 and a right-hand lever arm 157, which lever arms have hubs 158 pinned to a rock shaft 160, the whole constituting a pivoted bail capable of being depressed by striking the bar 154 with the finger. The bar 154 has a vertical flange part 159 which occupies such a position relative to the lever arm 150 as that when said lever arm stands in its forward position as it does when the totalizer is clear, then the bar 154 can be depressed; but when said lever 150 stands in its rear position indicating that the totalizer is not clear, then its end stands beneath the flange 159 and prevents the depression of the bar 154. The arm 156 is shown of a U-shape to avoid interference with certain other parts in the machine. The rock shaft 160 is pivoted at its left-hand end in the frame plate 20 or in a bracket from said plate and at its right-hand end it is pivoted in a bracket 161 made of sheet metal and secured to the end of the casting 18 by means of the screws 22 which, as above described, also retain the frame plate 21.

Figure 11:
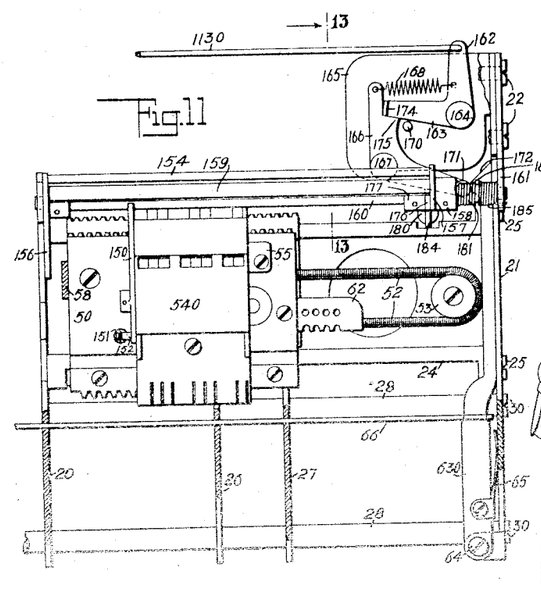
Fig. 11 is a front elevation of the cross footing totalizer and some of its associated parts, the clearance proof mechanism being shown in locking position.
Figure 12:
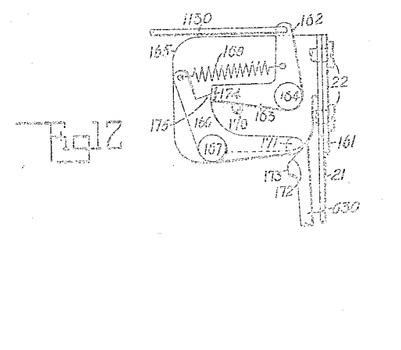
Fig. 12 is a fragmentary view of a portion of the same but with the parts in unlocked position.
Figures 13, 14:
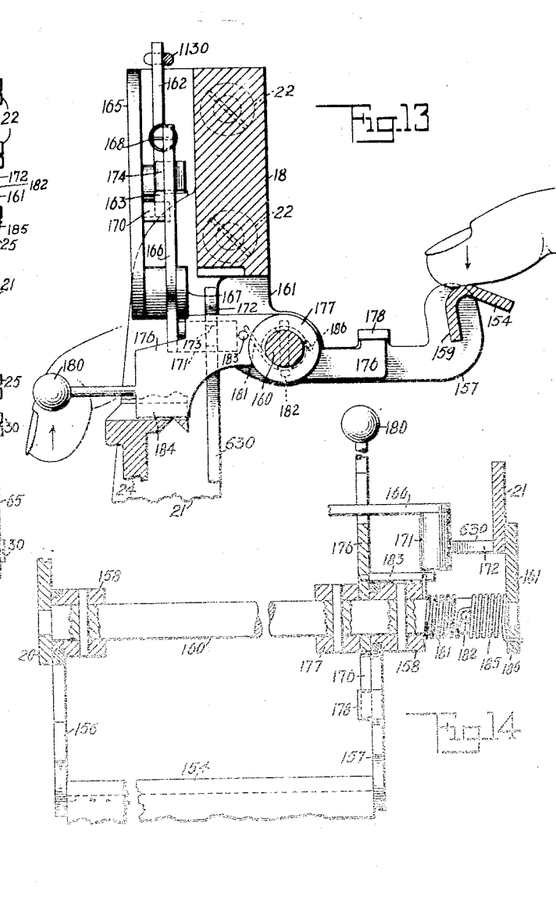
Fig. 13 is a view in section on the line 13—13 of Fig. 11 but on a larger scale than Fig. 11.
Fig. 14 is a fragmentary plan view of part of the mechanism shown in Fig. 12 with parts in section and parts broken away.

The wire 1130, which is pushed toward the right at a predetermined point in the program of operation, as has been described, is pivoted at its right-hand end to an arm 162 of a bell crank latch lever which has also a horizontal arm 163, said lever being pivoted at 164 to a sheet metal frame plate 165 preferably consisting of a part bent off from the bracket 161. A second bell crank 166 is pivoted to said plate 165 at 167 and a spring 168 connecting the two bell cranks tends to rock the first in a counter-clockwise direction and the second in a clockwise direction as shown in Fig. 11. Said spring is connected to the lever arm 162 comparatively close to its pivot and to the lever arm 163 comparatively remote from its pivot so that the turning movement on the latter is greater than on the former. The motion of the latch lever 162, 163 under the tension of said spring is limited by a fixed stud 170. The bell crank 166 has a pin 171 projecting from its horizontal arm toward the front of the machine in position to engage an incline or cam 172 on the upper end of the locking lever 630 which corresponds to the locking lever 63 of the other form of the invention, said lever, however, being prolonged upward to come within range of the motion of said pin 171. Below the incline or cam edge 172 the lever 630 has a vertical or dwell edge 173. In the normal unlocking position of the parts shown in Fig. 12 the pin 171 stands in a position to engage the incline 172 and in the locking position shown in Fig. 11 the bell crank 166 swings said pin downward and said pin forces the lever 630 to its right or locking position and comes to rest in engagement with the dwell 172. The lever arm 163 has a lug 174 bent off therefrom in position to engage the tooth or shoulder 175 on the lever 166, the normal position being shown in Fig. 12 where said lug 174 engaging said tooth holds the lever 166 in its unlocking position against the tension of the spring 168. When, however, the wire 1130 is pushed toward the right the lug 174 rises above the tooth 175 and the spring 168 pulls the lever 166 to the position shown in Fig. 11 where the parts remain, the lug 174 resting on top of the tooth 175. It will be perceived that by the described means the lock is thrown in every time the totalizer or "dummy" 36 passes to its sub-units position as in the first form of the invention. In the present form of the invention the mechanism is unlocked by depressing the bar 154 by hand. To this end a lever 176 (Figs. 13 and 14) is loosely pivoted on a shaft 160 between the right-hand hub 158 and the fixed collar 177. The arm 157 of the key or hand operated bail 154 has a lug 178 bent off therefrom and lying over the forward end of the lever 176 so that when the bar 154 is depressed the lever 176 will rock with said bail. The rear arm of said lever 176 lies beneath the bell crank 166 which will therefore be moved to unlocking position when the bail is operated. Said lever 176 is prolonged toward the rear and terminates in a handle here shown as having the form of a knob 180. The construction is such that in case the bar 154 is locked the operator can put his finger underneath the knob 180 and operate the lever 176 independently of said bar and it is for this reason that said lever is loosely pivoted on the shaft 160. A spring 181 is coiled about said shaft 160 and at one end it is connected with a pin 182 projecting from the shaft, and at its other end it bears against a pin 183 projecting from the lever 176, the force of this spring holding said lever in its normal relation to the bail, that is to say, with the forward end of the lever pressed against the lug 178. The rear arm of the lever has a lug 184 (Fig. 13) adapted to engage the upper surface of the casting 24 which is here shown machined-off at the proper point for the purpose. The pin 182 projects from both sides of the shaft 160 and a second spring 185 is coiled about the end of the shaft and is hooked over said pin at one end and in its other end is passed through a hole 186, (Fig. 9) in the bracket 161. The force of this spring tends to elevate the finger bar 154. This, however, it is unable to do beyond the point where the lug 184 strikes the casting 24 for the reason that said spring 185 is thereafter unable to overcome the spring 181.

The bar 154 can, however, be swung up by hand a considerable distance and this is done whenever it is desired to remove the totalizer 540 from its truck 50 or to place a totalizer on said truck, an operation which would otherwise be more or less interfered with by the bail. Upon releasing the bail after such an elevation of it it is restored to its normal position by the spring 181 and on depressing the bail it is raised to its normal position by the spring 185.

The mode of operation of this form of the invention is as follows: When the carriage reaches the sub-units position of the totalizer or "dummy" 36 the cam 111 (Fig. 3) operates the bell crank 97, 98 and pushes the wire 1130 momentarily toward the left, tripping the latch lever 162, 163 and allowing the lever 166 to swing about its pivot and the pin 171 to operate the locking lever 630. At the same time, the cross footer is freed and jumps back to the right. The flange 159 of the bar 154 is of such length however as to co-operate with the lever 150 in any position of the cross footer carriage. It is made a rule of operation of the machine that at the end of every cycle of the program of operation the operator shall strike the bar 154. If the cross totalizer is clear the bar will be depressed and the machine unlocked, but if the cross totalizer is not clear the bar will be found locked against depression, a circumstance which the operator will usually instantly observe. If, however, she fails to observe it she will, on attempting the next step of operation of the machine, find said machine locked up and will thereby have her attention called to the fact that she has made a mistake. In case the cross totalizer is not clear it is necessary for the operator to make the necessary corrections and to this end she unlocks the machine by manipulating the knob 180.

The Wahl machine has in the actuator thereof certain disks or fans 190 (Fig. 15) to which the links 47 are pivoted and which are therefore operated by the numeral keys. Each of said fans has a concentric part 191 projecting therefrom in such position that on the down stroke of the key the forward part of said projection swings the universal bar 83 toward the front of the machine, at the end of the down stroke said universal bar falls off of the part 191 back to its normal position shown in Fig. 15, and on the upstroke of the key the part 191 swings the universal bar toward the back of the machine approximately to the position shown in broken lines in Fig. 15. The fans 190 also operate certain goose-neck cams (not shown), which cams act on rollers 192 mounted in arms 193, which arms are rigidly mounted on a differential rock shaft 194. This rock shaft carries the gear segment which drives the master wheel. All of this mechanism being described in the patent to Wahl hereinbefore referred to, it has not been shown in detail in the drawings. The shaft 194 has an arm 195 projecting therefrom, which arm has a notch that is engaged by a lock 196 pivoted at 197 to a bracket 198 fastened to the main casting 18. The lower end of the lock 196 is in such position that the universal bar 83 at its forward stroke strikes said lower end and releases the latch, allowing the shaft 194 to be rocked by the operated goose-neck.

A release lever 200 is pivoted to the bracket 198 at 201 and said lever is normally in locking engagement with a lever 202 pivoted to said bracket at 203 and drawn toward the rear of the machine by a spring 204. The lever 202 has a lower arm or finger 205 which when said lever is released and allowed to swing toward the rear of the machine, strikes the universal bar 83 and swings it to the position shown in dotted lines in Fig. 15 where said universal bar is entirely out of the range of the parts 191 of the fans 190. The effect of this swinging of the lever 202 is thus to operatively disconnect the adding mechanism from the numeral keys and in particular to prevent the depression of a numeral key from swinging the universal bar toward the front. This releasing motion of the lever 202 is permitted by moving the release lever 200 downward to a position where it lets go of lever 202 and allows the latter lever to be operated by its spring. The parts are restored to their normal condition by pulling upward on the lever 200 the lower end of which forces the lever 202 forward and locks it there, as will be understood from the drawing. Said lever 202 has a pin 206 projecting therefrom through a slot in the bracket 198 in position to engage the latch 196 and release said latch and hold it released so that the shaft 194 is free to be rocked by its goose-necks, but it will be rocked idly and have no effect on the master wheel or other computing mechanism.

It will be noted that my clearance proof lock acts by preventing the forward rocking motion of the shaft 84 when the keys are depressed and therefore by preventing the depression of said keys, but when the calculating mechanism is disconnected by means of the lever 200, then a depression of the numeral keys does not effect the universal bar 83 and the keys are therefore not locked. In short, my clearance proof lock does not interfere with the operation of the numeral keys when the calculating mechanism is disconnected for the purpose of doing ordinary typewriting without calculating.

Furthermore, in the specific construction described the keys are not locked except when a vertical totalizer is over the roll 88, so that the writing of dates, etc., outside of the adding columns, is not interfered with.

Various changes, other than those specifically described, can be made without departing from my invention.

What I claim as new and desire to secure by Letters Patent, is,

1. In a calculating machine, the combination of a plurality of totalizers, a lock, means controlled by one of said totalizers for operating said lock, and means controlled by the state of another of said totalizers for neutralizing such operation.

2. In a calculating machine, the combination of a plurality of totalizers, a lock, means controlled by one of said totalizers for operating said lock, and means controlled by the state of another of said totalizers as to clear or not clear for neutralizing such operation in case the latter totalizer is clear.

3. In a calculating machine, the combination with a traveling carriage and means for printing numbers in different column positions, of a totalizer, means for registering in said totalizer numbers written in different positions of said carriage, means controlled by the travel of the carriage for locking an essential part of the machine, and means controlled by the state of said totalizer for releasing said lock or not, depending upon the state of said totalizer.

4. In a calculating machine, the combination of a traveling totalizer, clearance proof mechanism for said totalizer including a trip device carried by said totalizer and adapted to stand in one position when said totalizer is clear and in another position when said totalizer is not clear, and a co-operating trip device standing in the path of travel of the first mentioned trip device and adapted to be operated by it due to the travel of said totalizer in case the first mentioned trip device stands in one of said positions but not if it stands in the other position.

5. In a calculating machine, the combination with a traveling totalizer, of clearance proof mechanism including a tappet which stands in one position in case said totalizer is clear and in another position in case said totalizer is not clear, a trigger which, when said totalizer travels, is in the path of said tappet in one of said cases and not in the other, and a lock controlled by said trigger.

6. In a calculating machine, the combination with a traveling totalizer, of clearance proof mechanism including a tappet which stands in one position in case said totalizer is clear and in another position in case said totalizer is not clear, a trigger which, when said totalizer travels, is in the path of said tappet in one of said cases and not in the other, and means controlled by said trigger to notify the operator of the state of the totalizer.

7. In a calculating machine, the combination with a traveling totalizer, of clearance proof mechanism including a lock, a trigger for controlling said lock, and a device carried by the totalizer and adapted, during the travel of said totalizer, to strike said trigger and operate it or not depending on the position of said device, and means whereby the position of said device is controlled by the state of the totalizer as a whole, as to clear and not clear.

8. In a calculating machine, the combination with means for printing and registering numbers in accordance with a mechanically pre-arranged program, of a lock, means for bringing said lock into action at a predetermined point in said program to prevent the continuance of said program, and means dependent on the state of said calculating mechanism for automatically releasing said lock.

9. In a calculating machine, the combination with printing means, a totalizer, and means settable for a predetermined program of calculations in said totalizer of clearance proof mechanism including locking means, a latch for said locking means, and means for giving said latch a quick releasing reciprocation at a predetermined point in said program.

10. In a calculating machine, the combination with printing means, a totalizer, and means settable for a predetermined program of calculations in said totalizer, of clearance proof mechanism including locking means, a latch for said locking means, means for giving said latch a quick releasing reciprocation at a predetermined point in said program, and means controlled by said totalizer for immediately releasing said locking means in case said totalizer is clear.

11. In a calculating machine, the combination with printing means, a traveling carriage, and a totalizer, of clearance proof mechanism for said totalizer, and a trip device for bringing said clearance proof mechanism into action at a predetermined point in the travel of the carriage in one direction but inoperative by the travel of the carriage in the other direction.

12. In a calculating machine, the combination with a totalizer, means settable for a predetermined program of calculations in said totalizer, and means for operating said totalizer, of spring operated means for locking an essential part of the mechanism, a latch for restraining said spring operated means, means for imparting a quick releasing reciprocation to said latch at a predetermined point in said program, and means controlled by said totalizer in case said totalizer is clear to restore said spring actuated means.

13. In a calculating machine, the combination with a jumping totalizer, and means for operating the same, of a tappet movably mounted in said totalizer and controlled by the register wheels, said tappet occupying one position when all of said wheels stand at zero and another position when not all of said wheels stand at zero, and a clearance proof device operated by said tappet when said totalizer makes its jump to normal position.

14. In a calculating machine, the combination with a totalizer, means for operating said totalizer, and means settable for a predetermined program of calculations in said totalizer, of clearance proof mechanism including a lever having a cam-shaped arm and a tappet in said totalizer and movable to two positions depending on the state of said totalizer, said tappet acting, due to the travel of said totalizer, on said lever in one position of said tappet and not in the other position.

15. In a calculating machine, the combination with a totalizer, means for operating said totalizer, and means set for a predetermined program of calculations in said totalizer, of clearance proof mechanism including a tappet whose position is controlled by the state of said totalizer, and a co-operating device automatically brought into co-operation with said tappet at a predetermined point in said program.

16. In a calculating machine, the combination with a totalizer and means for operating the same, of clearance proof mechanism including a lock, means for automatically bringing said lock into action at a time when the totalizer should be clear, and means for releasing said lock, said releasing means being effective only in case the totalizer as a whole is clear.

17. In a calculating machine, the combination with a totalizer, and means for operating the same, of a lock, means for automatically bringing said lock into action at a time when the totalizer should be clear, a tappet common to all of the wheels of the totalizer and whose position is controlled by the state of the totalizer, and means dependent for its effectiveness on the position of said tappet for releasing said lock.

18. In a calculating machine, the combination with a jumping totalizer, means for operating the same, and a locking member operated by said jumping totalizer when the latter is in its normal position, of clearance proof mechanism including means for holding said locking member in locking position when the jumping totalizer is out of normal position.

19. In a calculating machine, the combination with a carriage, one or more vertical totalizers, a cross totalizer, a lock controlled by the joint action of a vertical totalizer and said cross totalizer, and clearance proof mechanism including a device adapted to control said lock by joint action of said device and a vertical totalizer whereby said lock is effective only when the carriage is in a computing zone.

20. In a calculating machine and in clearance proof mechanism, the combination with a totalizer, of automatically operating means for first locking some part of the machine whether or no in the clearing operation the totalizer has been brought to zero, and other means controlled by the state of the totalizer for unlocking said part of the machine if the totalizer has been returned to zero but which leaves said part in locked condition if the totalizer has not been wholly cleared.

Signed at the borough of Manhattan, city of New York, in the county of New York and State of New York this 18th day of April, A. D. 1921.

ARTHUR F. POOLE.

Witnesses:
  E. M. WELLS,
  CHARLES E. SMITH.